US012715329B2

(12) United States Patent
Hall et al.

(10) Patent No.: US 12,715,329 B2
(45) Date of Patent: Aug. 25, 2026

(54) VEHICLE CHARGING SYSTEMS AND METHODS FOR MITIGATING ELECTRIC VEHICLE SUPPLY EQUIPMENT OVERHEATING

(71) Applicant: FORD GLOBAL TECHNOLOGIES, LLC, Dearborn, MI (US)

(72) Inventors: Marie Louise Hall, Dundee, MI (US); Timothy Harris, Grosse Ile, MI (US); Christopher Bernard Trombetta, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 745 days.

(21) Appl. No.: 18/183,414

(22) Filed: Mar. 14, 2023

(65) Prior Publication Data

US 2024/0308375 A1 Sep. 19, 2024

(51) Int. Cl.

| | |
|---|---|
| ***B60L 53/62*** | (2019.01) |
| ***B60L 53/16*** | (2019.01) |
| ***H02J 7/65*** | (2026.01) |
| ***H02J 7/90*** | (2026.01) |
| *G01K 13/00* | (2021.01) |

(52) U.S. Cl.
CPC ............... *B60L 53/62* (2019.02); *B60L 53/16* (2019.02); *H02J 7/65* (2026.01); *H02J 7/975* (2026.01); *G01K 13/00* (2013.01)

(58) Field of Classification Search
CPC .... B60L 53/62; B60L 53/16; H02J 7/007192; H02J 7/00309
USPC .......................................................... 320/109
See application file for complete search history.

(56) References Cited

U.S. PATENT DOCUMENTS

| | | | |
|---|---|---|---|
| 8,558,504 | B2 | 10/2013 | Brown et al. |
| 9,475,400 | B2 | 10/2016 | Hooker et al. |
| 11,465,519 | B2 | 10/2022 | Zoon et al. |
| 2002/0057582 | A1 | 5/2002 | Nakayama et al. |

(Continued)

FOREIGN PATENT DOCUMENTS

| | | | | |
|---|---|---|---|---|
| CN | 101777754 B | | 9/2012 | |
| CN | 113991811 A | * | 1/2022 | .......... H02J 7/00309 |

(Continued)

OTHER PUBLICATIONS

Translation of CN113991811, 17 pages.*

(Continued)

*Primary Examiner* — Nathaniel R Pelton
(74) *Attorney, Agent, or Firm* — David B. Kelley; Carlson, Gaskey & Olds, P.C.

(57) ABSTRACT

Vehicle charging systems and methods are provided for controlling an electric vehicle supply equipment (EVSE) assembly during a vehicle charging event. A temperature of the EVSE assembly may be monitored, and the EVSE assembly may be shut down when the temperature exceeds a predefined temperature threshold. After the temperature falls back below the predefined temperature threshold, the EVSE assembly may be restarted at a reduced charging current level. This process of shut down and restart may be continuously repeated until the temperature of the EVSE assembly can be maintained below the predefined threshold temperature during the charging event, thereby reducing charging standby times.

20 Claims, 3 Drawing Sheets

(56) References Cited

U.S. PATENT DOCUMENTS

| | | | | |
|---|---|---|---|---|
| 2007/0222412 | A1 | 9/2007 | Maloizel et al. | |
| 2009/0167537 | A1 | 7/2009 | Feliss et al. | |
| 2010/0156355 | A1 | 6/2010 | Bauerle et al. | |
| 2010/0174667 | A1 | 7/2010 | Vitale et al. | |
| 2010/0211643 | A1 | 8/2010 | Lowenthal et al. | |
| 2010/0259242 | A1 | 10/2010 | Gale et al. | |
| 2015/0251549 | A1* | 9/2015 | Hofer | H02J 7/00714 320/109 |
| 2016/0043594 | A1* | 2/2016 | Yamaguchi | H02J 3/14 307/24 |
| 2017/0334300 | A1* | 11/2017 | Huang | B60L 53/16 |
| 2020/0238841 | A1* | 7/2020 | Zaki | B60L 53/60 |

FOREIGN PATENT DOCUMENTS

| | | | |
|---|---|---|---|
| DE | 3317834 | A1 | 11/1983 |
| DE | 19503310 | A1 | 8/1996 |
| DE | 102009058263 | A1 | 8/2010 |
| FR | 2728712 | A1 | 6/1996 |
| WO | 9308630 | | 4/1993 |
| WO | 2010049775 | A1 | 5/2010 |

OTHER PUBLICATIONS

SAE International, Surface Vehicle Standard, SAE Electric Vehicle and Plug in Hybrid Electric Vehicle Conductive Charge Coupler, J1772TM, Oct. 2017, 116 pages.

* cited by examiner

VEHICLE CHARGING SYSTEMS AND METHODS FOR MITIGATING ELECTRIC VEHICLE SUPPLY EQUIPMENT OVERHEATING

TECHNICAL FIELD

This disclosure relates to vehicle charging systems and methods capable of performing current foldback procedures for mitigating ambient overheating during charging events.

BACKGROUND

A traction battery pack typically powers an electric machine and other electrical loads of an electrified vehicle. The traction battery pack includes a plurality of battery cells that must be periodically charged to replenish the energy necessary to power these loads. Ambient temperatures can influence the ability to efficiently charge battery cells.

SUMMARY

A vehicle charging system according to an exemplary aspect of the present disclosure includes, among other things, an electric vehicle supply equipment (EVSE) assembly, and a controller programmed to shut down the EVSE assembly when a temperature associated with the EVSE assembly exceeds a predefined temperature threshold during a charging event and further configured to restart the EVSE assembly at a reduced charging current when the temperature subsequently falls below the predefined temperature threshold during the charging event.

In a further non-limiting embodiment of the foregoing vehicle charging system, the reduced charging current is smaller in magnitude than a charging current supplied by the EVSE assembly prior to the restart.

In a further non-limiting embodiment of either of the foregoing vehicle charging systems, the controller is further programmed to shut down the EVSE assembly a second time when the temperature exceeds the predefined temperature threshold and restart the EVSE assembly at a second reduced charging current when the temperature subsequently falls below the predefined temperature threshold.

In a further non-limiting embodiment of any of the foregoing vehicle charging systems, the second reduced charging current is smaller in magnitude than the reduced charging current.

In a further non-limiting embodiment of any of the foregoing vehicle charging systems, the controller is further programmed to shut down the EVSE assembly a third time when the temperature exceeds the predefined temperature threshold and restart the EVSE assembly at a third reduced charging current when the temperature subsequently falls below the predefined temperature threshold.

In a further non-limiting embodiment of any of the foregoing vehicle charging systems, the third reduced charging current is smaller in magnitude than the second reduced charging current.

In a further non-limiting embodiment of any of the foregoing vehicle charging systems, the EVSE assembly includes a current control system configured to selectively isolate a grid input from a power output of the EVSE assembly.

In a further non-limiting embodiment of any of the foregoing vehicle charging systems, a sensor system is operably coupled to the controller and configured to monitor the temperature associated with the EVSE assembly.

In a further non-limiting embodiment of any of the foregoing vehicle charging systems, the sensor system includes a temperature sensor mounted within an EVSE housing of the EVSE assembly.

In a further non-limiting embodiment of any of the foregoing vehicle charging systems, the sensor system includes a temperature sensor mounted within a charge coupler of the EVSE assembly.

A method according to another exemplary aspect of the present disclosure includes, among other things, monitoring a temperature associated with an electric vehicle supply equipment (EVSE) assembly during a vehicle charging event, shutting down the EVSE assembly when the temperature exceeds a predefined temperature threshold, and restarting the EVSE assembly at a first reduced charging current when the temperature falls below the predefined temperature threshold.

In a further non-limiting embodiment of the foregoing method, monitoring the temperature includes monitoring a temperature of a charge coupler of the EVSE assembly.

In a further non-limiting embodiment of either of the foregoing methods, monitoring the temperature includes monitoring a temperature inside an EVSE housing of the EVSE assembly.

In a further non-limiting embodiment of any of the foregoing methods, the method includes shutting down the EVSE assembly a second time when the temperature exceeds the predefined temperature threshold and restarting the EVSE assembly at a second reduced charging current when the temperature falls below the predefined temperature threshold.

In a further non-limiting embodiment of any of the foregoing methods, the method includes repeatedly performing the shutting down and the restarting until the temperature of the EVSE assembly is maintained below the predefined temperature threshold.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle charging systems and methods for controlling an electric vehicle supply equipment (EVSE) assembly during a vehicle charging event. A temperature of the EVSE assembly may be monitored, and the EVSE assembly may be shut down when the temperature exceeds a predefined temperature threshold. After the temperature falls back below the predefined temperature threshold, the EVSE assembly may be restarted at a reduced charging current level. This process of shut down and restart may be continuously repeated until the temperature of the EVSE assembly can be maintained below the predefined threshold temperature during the charging event, thereby reducing charging standby times. These and other features of this disclosure are discussed in greater detail in the following paragraphs of this detailed description.

Figure 1:
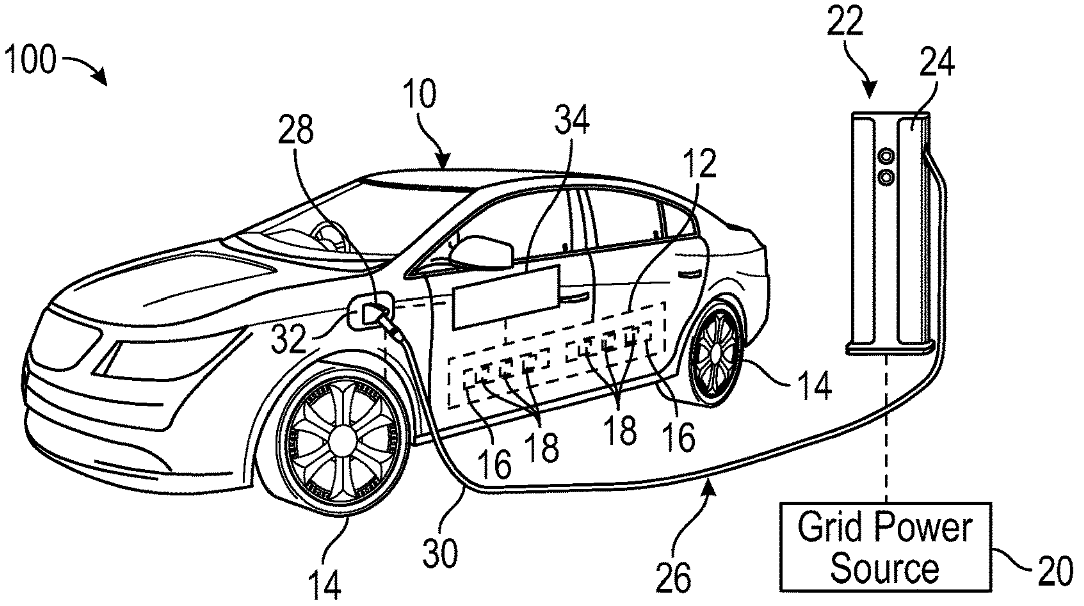
FIG. 1 schematically illustrates a vehicle charging system for charging an electrified vehicle.

FIG. 1 illustrates a vehicle charging system 100 for charging an electrified vehicle 10. The electrified vehicle 10 may include any electrified powertrain capable of applying a torque from an electric machine for providing motive power for driving drive wheels 14 (or other traction devices) of the electrified vehicle 10. In an embodiment, the electrified vehicle 10 is a plug-in hybrid electric vehicle (PHEV). In another embodiment, the electrified vehicle is a battery electric vehicle (BEV). Therefore, the powertrain of the electrified vehicle 10 may electrically propel the drive wheels 14 either with or without the assistance of an internal combustion engine.

The electrified vehicle 10 of FIG. 1 is schematically illustrated as a sedan style car. However, the teachings of this disclosure may be applicable to any type of vehicle, including but not limited to, cars, trucks, vans, sport utility vehicles (SUVs), airplanes, boats, buses, drones, etc.

The electrified vehicle 10 includes a traction battery pack 12. Although shown schematically, the traction battery pack 12 may be a high voltage traction battery pack that includes a plurality of battery arrays 16 (e.g., battery assemblies or groupings of battery cells 18) capable of outputting electrical power to one or more electric machines (e.g., electric motors) of the electrified vehicle 10. In an embodiment, the battery cells 18 are lithium-ion battery cells. However, other types of energy storage devices and/or output devices could be used to electrically power the electrified vehicle 10.

The vehicle charging system 100 may be configured to transfer energy from a grid power source 20 (e.g., AC power, solar power, wind power, or combinations thereof) to the electrified vehicle 10 for replenishing the energy levels of the battery cells 18. The vehicle charging system 100 may be configured to provide any level of charging (e.g., Level 1 AC charging, Level 2 AC charging, DC fast charging, etc.).

An electric vehicle supply equipment (EVSE) assembly 22 of the vehicle charging system 100 may establish an interface for transferring energy from the grid power source 20 to the electrified vehicle 10 for charging the traction battery pack 12. The EVSE assembly 22 may include an EVSE housing 24 and a charge cord assembly 26. The EVSE housing 24 may be configured as a charging station stanchion (see FIG. 1), a wall box (see FIG. 2), etc. The specific configuration of the EVSE housing 24 is not intended to limit this disclosure. The EVSE housing 24 may include the necessary equipment (e.g., relays, human machine interfaces, etc.) for coordinating the transfer of energy between the grid power source 20 and the electrified vehicle 10.

The charge cord assembly 26 may include a charge coupler 28 and a cable 30. The cable 30 may be connected at one end to the charge coupler 28 and at an opposite end to the EVSE housing 24. The charge coupler 28 may be coupled (e.g., plugged-in) to a charge port assembly 32 (sometimes referred to as a vehicle inlet assembly) of the vehicle charging system 100. The charge port assembly 32 is a component of the electrified vehicle 10 and is configured to receive energy from the EVSE assembly 22. The energy received at the charge port assembly 32 may be transferred to the traction battery pack 12 for charging the battery cells 18.

In an embodiment, the charge coupler 28 is configured to plug into an SAE J1772 type charge port assembly 32. However, other charge coupler/charge port configurations are further contemplated within the scope of this disclosure. The specific configurations of the charge coupler 28 and the charge port assembly 32 are therefore not intended to limit this disclosure.

The electrified vehicle 10 may further include a controller 34 that may operably connect to the vehicle charging system 100. The controller 34 may be configured to communicate with the EVSE assembly 22 in order to coordinate charging operations of the electrified vehicle 10. For example, during a charging event, the controller 34 may receive a pulse width modulation signal having a duty cycle at a fixed frequency and interpret this signal to derive a maximum current capacity of the EVSE assembly 22. The controller 34 may receive and interpret this information and determine whether or not the electrified vehicle 10 is capable of receiving the maximum current capacity of the EVSE assembly 22. If so, the controller 34 may command the transfer of the energy received at the charge port assembly 32 to the traction battery pack 12.

Relatively high ambient temperatures can negatively influence the ability of the EVSE assembly 22 to efficiently transfer energy to the electrified vehicle 10. Typically, the EVSE assembly 22 shuts down to stop charging the electrified vehicle 10 when the temperature exceeds a predefined allowable temperature threshold of the EVSE assembly 22. The EVSE assembly 22 will subsequently continue charging (at the same charging current level previously used) only when the temperature falls below the predefined temperature threshold. This creates a loop of shutdown and restart of the EVSE assembly 22 that increases charging times and thus hinders the efficiency of the vehicle charging system 100. This disclosure is therefore directed to systems and methods for performing current foldback procedures for mitigating ambient overheating of the EVSE assembly 22 during charging events.

Figure 3:
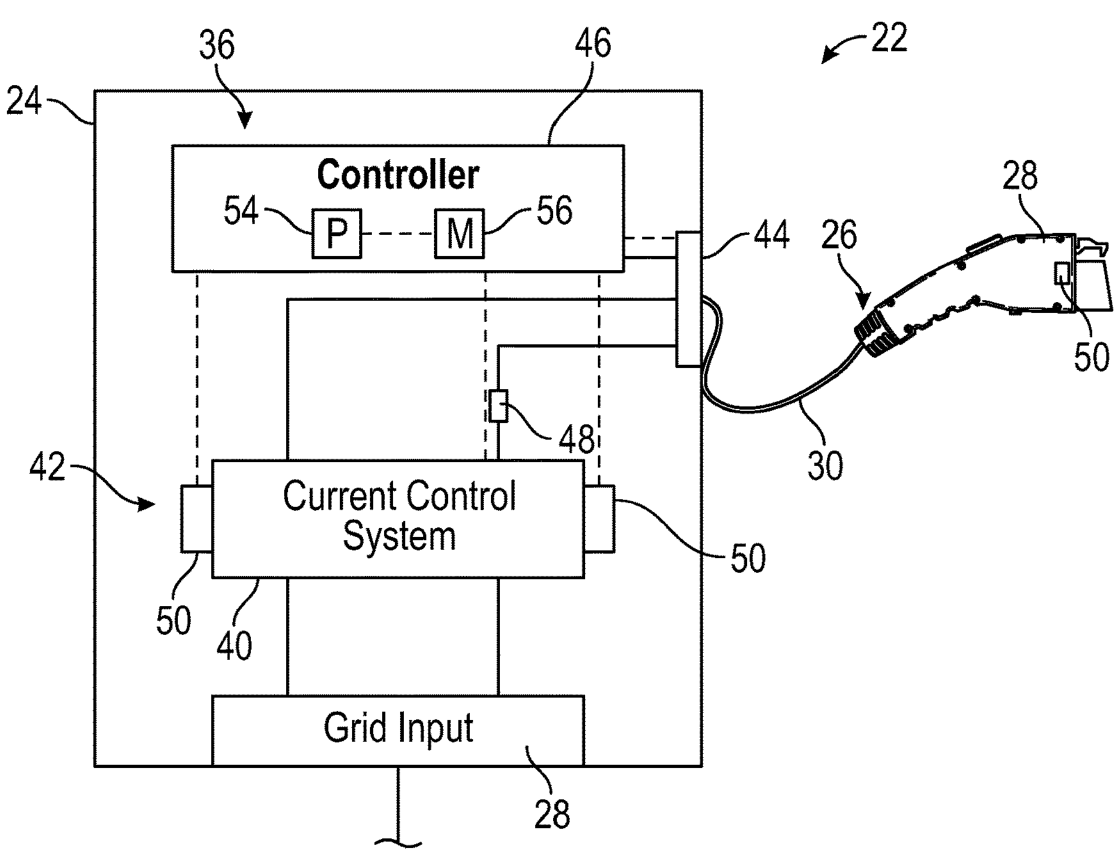
FIG. 3 schematically illustrates a monitoring system of an EVSE assembly.

FIG. 3 is a highly schematic depiction of a monitoring system 36 of the EVSE assembly 22. In an exemplary implementation, a majority of the components of the monitoring system 36 may be housed within the EVSE housing 24. However, some components could be external to the EVSE housing 24.

The monitoring system 36 of the EVSE assembly 22 may include, among various other components, a grid input 38, a current control system 40, a sensor system 42, a power output 44, and a controller 46. As further discussed below, the monitoring system 36 may be configured to execute a current foldback procedure in which the EVSE assembly 22 is continuously shut down and then restarted at a reduced charging current level for mitigating overheating of the EVSE assembly 22 during charging events.

The grid input 38 may be configured for receiving power from the grid power source 20. The grid input 38 may be configured to receive either alternating current (AC) power or direct current (DC) power from the grid power source 20. The power output 44 is operably connected to the charge cord assembly 26 of the EVSE assembly 22.

The current control system 40 may be operably connected between the grid input 38 and the power output 44. The current control system 40 may therefore be configured to control a flow of charging current from the grid power source 20 to the charge coupler 28 of the charge cord assembly 26. The current control system 40 may include one or more fuses, relays, contactors etc. that may be controlled (e.g., opened or tripped) to prevent charging current from flowing through the power output 44 to the charge cord assembly 26, such as during over-temperature and/or over-current conditions of the EVSE assembly 22, for example.

The sensor system 42 may include one or more current sensors 48 and one or more temperature sensors 50. Each current sensor 48 may be configured to measure or sense the current of the power flowing to the power output 44 during operation of the EVSE assembly 22, such as during a vehicle charging event. In an embodiment, the current sensor 48 is located between the current control system 40 and the power output 44. The current sensor 48 may be configured to transmit signals representative of the measured or sensed current to the controller 46.

The temperature sensors 50 may be located inside the EVSE housing 24, inside the charge coupler 28, or both, and each temperature sensor 50 may be configured to measure or sense a temperature associated with the EVSE housing 24 and/or the charge coupler 28. In an embodiment, the temperature sensors 50 are thermistors. However, other types of sensors could alternatively or additionally be utilized for monitoring temperature conditions associated with the EVSE assembly 22. The temperature sensors 50 may be configured to transmit signals representative of the measured or sensed temperatures to the controller 46.

The controller 46 may include a processing unit 54 and non-transitory memory 56 for executing various control strategies of the monitoring system 36. The processing unit 54 can be programmed to execute one or more programs stored in the memory 56. The programs may be stored in the memory 56 as software code, for example. The programs stored in the memory 56 may include one or more additional or separate programs, each of which includes an ordered list of executable instructions for implementing logical functions associated with the monitoring system 36 of the EVSE assembly 22.

The processing unit 54 can be a custom made or commercially available processor, a central processing unit (CPU), or generally any device for executing software instructions. The memory 56 can include any one or combination of volatile memory elements and/or nonvolatile memory elements.

The processing unit 54 may be operably coupled to the memory 56 and may be configured to execute the one or more programs stored in the memory 56 of the controller 46 based on various inputs received from other devices, such as inputs from the sensor system 42, for example. For example, the sensor system 42 may periodically communicate signals to the controller 46 during charging events. The signals may include information associated with the EVSE assembly 22, such as the current temperature of the EVSE housing 24 and/or the charge coupler 28 during the charging event, for example.

Based on the input signals it receives, the controller 46 may be programmed to command (e.g., by communicating one or more control signals to other components of the EVSE assembly 22) the execution of a current foldback operation during the charging event. As part of the current foldback operation, the controller 46 may be programmed to shut down the EVSE assembly 22 when the temperature of the EVSE housing 24 and/or the charge coupler 28 (as indicated by the temperature sensors 50) exceeds a predefined temperature threshold. In an embodiment, shutting down the EVSE assembly 22 includes reducing the charging current supplied by the EVSE assembly 22 to zero without changing the current state of the switching devices of the current control system 40.

The predefined temperature threshold can be pre-programmed at any desired level and may be at least partially dictated by the material make-up of the EVSE housing 24 and/or the charge coupler 28. A person of ordinary skill in the art having the benefit of this disclosure would understand how to select and program the predefined temperature threshold.

The controller 46 may be further programmed to restart the EVSE assembly 22 at a first reduced charging current level when the temperature of the EVSE housing 24 and/or the charge coupler 28 (again, as indicated by the temperature sensors 50) falls back below the predefined temperature threshold during the charging event. The first reduced charging current level may be a predetermined static current that has a lower magnitude compared to the charging current level that was being transferred through the EVSE assembly 22 prior to the shutdown. In an embodiment, the first reduced charging current level is about 20% lower than the charging current level being transferred prior to the shutdown. However, the first reduced charging current level could be lower than the charging current level used prior to the shut down by any predefined amount.

The controller 46 may continue to monitor the temperature of the EVSE housing 24 and/or the charge coupler 28 after restarting the EVSE assembly 22. If the temperature is again determined to exceed the predefined temperature threshold during the charging event, the controller 46 may shut down the EVSE assembly 22 again, wait for the temperature to fall back below the predefined temperature threshold, and then restart the EVSE assembly 22 at a second reduced charging current level. The second reduced charging current level may be a predetermined static current that has a lower magnitude compared to the first reduced charging current level. In an embodiment, the second reduced charging current level is about 20% lower than the first reduced charging current level. However, the second reduced charging current level could be lower than the first reduced charging current level by any amount.

The foregoing process of continuously shutting down and then restarting the EVSE assembly 22 at a reduced current level may be continued throughout the charging event and until the temperature of the EVSE assembly 22 can be maintained below the predefined temperature threshold. The current foldback operation therefore allows for more consistent charging operations with reduced standby times.

Figure 2:
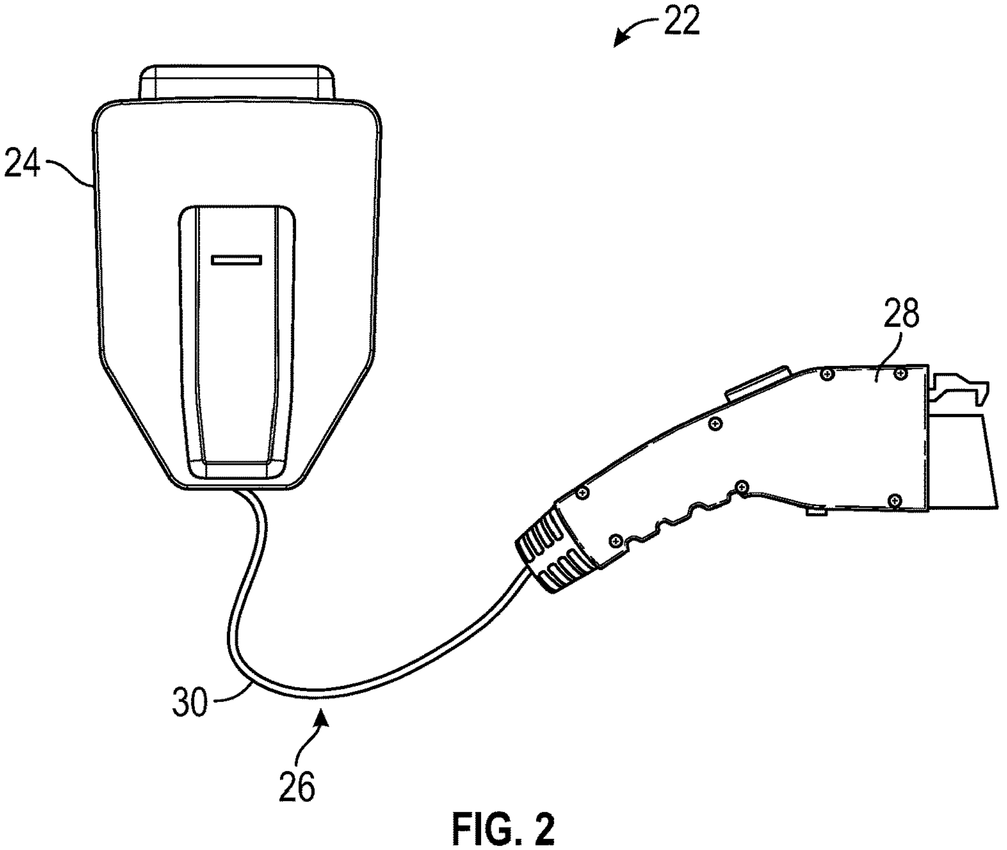
FIG. 2 schematically illustrates an electric vehicle supply equipment (EVSE) assembly of a vehicle charging system.
Figure 4:
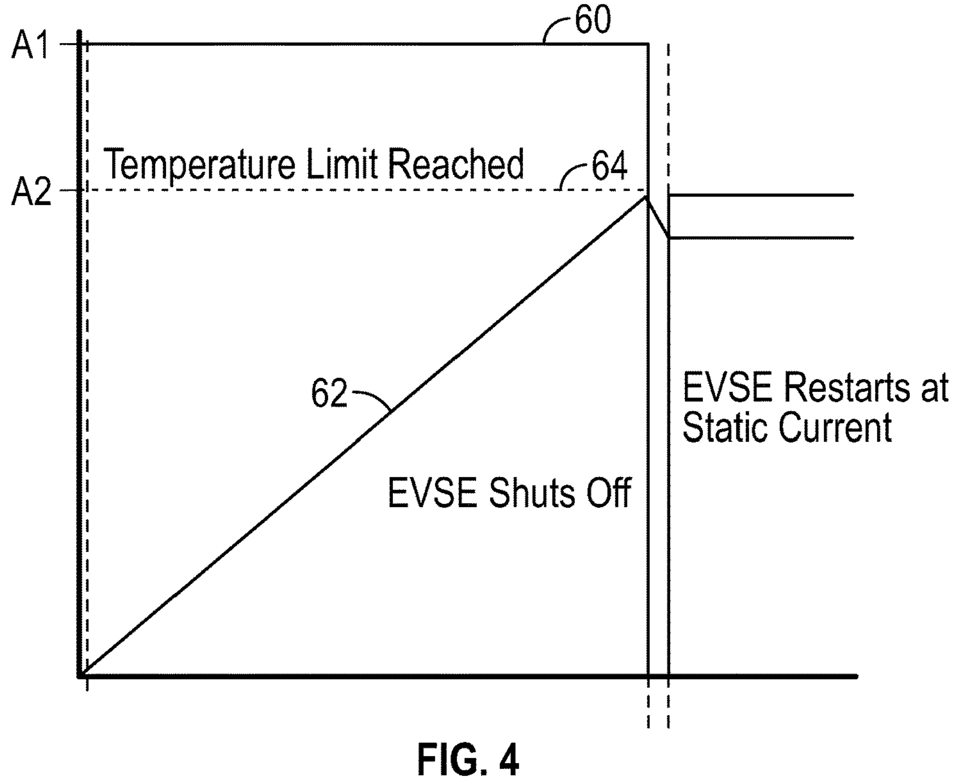
FIG. 4 graphically illustrates a current foldback procedure of a vehicle charging system.

FIG. 4 graphically illustrates the current feedback operation that can be performed by the monitoring system 36 of the EVSE assembly 22 of FIGS. 1-3. A plot 60, a plot 62, and a dashed line 64 are indicated in the graphical illustration. The plot 60 is representative of the charging current level being supplied by the EVSE assembly 22 during the charging event, the plot 62 is representative of a temperature of the EVSE assembly 22 during the charging event, and a dashed line 64 is representative of the predefined temperature threshold of the EVSE assembly 22.

As depicted by the graphical illustration, the charging current level supplied by the EVSE assembly 22 initially includes a first magnitude A1 during normal charging conditions. However, when the temperature of the EVSE assembly 22 reaches the predefined temperature threshold, the EVSE assembly 22 shuts down and then restarts at a reduced charging current level having a second amplitude A2 once the temperature of the EVSE assembly 22 falls back below the predefined temperature threshold. The second magnitude A2 is a lower charging current than the first magnitude A1 and therefore a reduced charging current level is supplied by the EVSE assembly 22 after the shutdown.

Figure 5:
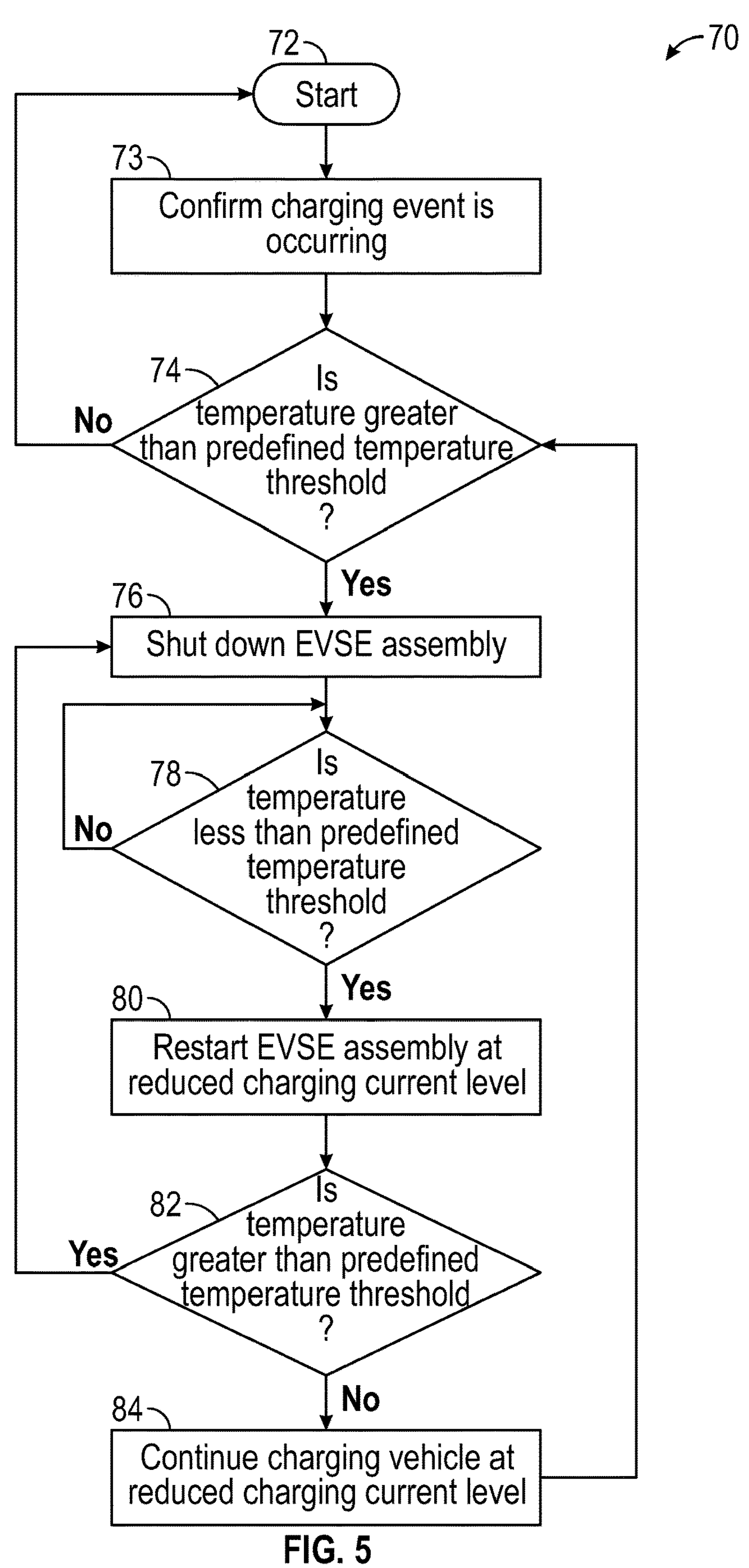
FIG. 5 schematically illustrates a method of controlling an EVSE assembly of a vehicle charging system during a vehicle charging event.

FIG. 5, with continued reference to FIGS. 1-4, schematically illustrates in flow chart form a method 70 for controlling the EVSE assembly 22 to perform a current foldback operation during a charging event. The monitoring system 36 of the EVSE assembly 22 may be configured to employ one or more algorithms adapted to execute at least a portion of the steps of the exemplary method 70. For example, the method 70 may be stored as executable instructions in the memory 56 of the controller 46, and the executable instructions may be embodied within any computer readable medium that can be executed by the processing unit 54 of the controller 46.

The method 70 may begin at block 72. At block 73, the method 70 may confirm that a charging event is occurring. This may include, for example, performing system checks to confirm the charge coupler 28 is coupled to the charge port assembly 32.

Next, at block 74, the method 70 may determine whether a current temperature of the EVSE assembly 22 (e.g., as indicated by the sensor system 42) exceeds the predefined temperature threshold. If YES, the method 70 may shut down the EVSE assembly 22 at block 76.

Subsequently, at block 78, the method 70 may determine whether the current temperature of the EVSE assembly 22 (e.g., as indicated by the sensor system 42) is less than predefined temperature threshold. If YES, the method 70 may restart the EVSE assembly 22 at a reduced charging current level for charging the electrified vehicle 10 at block 80.

The method 70 may again determine whether the current temperature of the EVSE assembly 22 (e.g., as indicated by the sensor system 42) exceeds the predefined temperature threshold at block 82. If YES, the method 70 may return to block 76. If NO, the EVSE assembly 22 may continue to charge the electrified vehicle 10 by transferring the reduced charging current level. The method 70 may then return to block 74 as part of a closed loop system for continuously performing the current foldback operations during the charging event.

The vehicle charging systems of this disclosure are configured to control an EVSE assembly using a current foldback procedure in which the charging current supplied by the EVSE assembly during a charging event is continuously reduced until a temperature of the EVSE assembly can be maintained below a predefined threshold temperature. Optimizing the charging current transferred by the EVSE assembly in this manner can provide more efficient charging with reduced standby times, especially during relatively hot ambient conditions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle charging system, comprising:

an electric vehicle supply equipment (EVSE) assembly; and a controller programmed to (1) shut down the EVSE assembly when a temperature associated with the EVSE assembly exceeds a predefined temperature threshold during a charging event, and (2) restart the EVSE assembly at a reduced charging current in response to determining that the temperature has fallen below the same predefined temperature threshold that triggered the shut down of the EVSE assembly during the charging event.

2. The vehicle charging system as recited in claim 1, wherein the reduced charging current is smaller in magnitude than a charging current supplied by the EVSE assembly prior to the restart.

3. The vehicle charging system as recited in claim 1, wherein the controller is further programmed to shut down the EVSE assembly a second time when the temperature exceeds the predefined temperature threshold and restart the EVSE assembly at a second reduced charging current when the temperature subsequently falls below the predefined temperature threshold.

4. The vehicle charging system as recited in claim 3, wherein the second reduced charging current is smaller in magnitude than the reduced charging current.

5. The vehicle charging system as recited in claim 3, wherein the controller is further programmed to shut down the EVSE assembly a third time when the temperature exceeds the predefined temperature threshold and restart the EVSE assembly at a third reduced charging current when the temperature subsequently falls below the predefined temperature threshold.

6. The vehicle charging system as recited in claim 5, wherein the third reduced charging current is smaller in magnitude than the second reduced charging current.

7. The vehicle charging system as recited in claim 1, wherein the EVSE assembly includes a current control system configured to selectively isolate a grid input from a power output of the EVSE assembly.

8. The vehicle charging system as recited in claim 1, comprising a sensor system operably coupled to the controller and configured to monitor the temperature associated with the EVSE assembly.

9. The vehicle charging system as recited in claim 8, wherein the sensor system includes a temperature sensor mounted within an EVSE housing of the EVSE assembly.

10. The vehicle charging system as recited in claim 8, wherein the sensor system includes a temperature sensor mounted within a charge coupler of the EVSE assembly.

11. The vehicle charging system as recited in claim 1, wherein the reduced charging current is about 20% lower than a charging current level delivered by the EVSE assembly before the shutdown.

12. The vehicle charging system as recited in claim 1, wherein the controller is programmed to shut down the EVSE assembly by commanding the delivered charging current supplied by the EVSE assembly to zero while maintaining a prior operating state of switching devices of a current control system of the EVSE assembly.

13. The vehicle charging system of claim 1, wherein the temperature associated with the EVSE assembly is derived based on a first temperature of an EVSE housing of the EVSE assembly, a second temperature of a charge coupler of the EVSE assembly, or both.

14. A method, comprising:

monitoring a temperature associated with an electric vehicle supply equipment (EVSE) assembly during a vehicle charging event;

shutting down the EVSE assembly when the temperature exceeds a predefined temperature threshold; and restarting the EVSE assembly at a first reduced charging current in response to determining that the temperature has fallen below the same predefined temperature threshold that triggered shutting down the EVSE assembly during the charging event.

15. The method as recited in claim 14, wherein monitoring the temperature includes monitoring a temperature of a charge coupler of the EVSE assembly.

16. The method as recited in claim 14, wherein the monitoring the temperature includes monitoring a temperature inside an EVSE housing of the EVSE assembly.

17. The method as recited in claim 14, comprising:

shutting down the EVSE assembly a second time when the temperature exceeds the predefined temperature threshold; and restarting the EVSE assembly at a second reduced charging current when the temperature falls below the predefined temperature threshold.

18. The method as recited in claim 17, comprising:

repeatedly performing the shutting down and the restarting until the temperature of the EVSE assembly is maintained below the predefined temperature threshold.

19. The method as recited in claim 14, wherein shutting down the EVSE assembly includes reducing a charging current supplied by the EVSE assembly to zero without changing a state of switching devices of a current control system of the EVSE assembly.

20. A vehicle charging system, comprising:

an electric vehicle supply equipment (EVSE) assembly; and a controller programmed to, during a charging event:

(i) monitor a temperature associated with the EVSE assembly, (ii) reduce a delivered charging current of the EVSE assembly to zero when the temperature exceeds a predefined temperature threshold, (iii) restart the EVSE assembly at a reduced charging current that is lower than the delivered charging current supplied immediately prior to the shutdown only after the temperature subsequently falls below the predefined temperature threshold during the charging event, and (iv) repeatedly perform steps (ii) and (iii) with successive reduced charging current levels, each lower than a charging current level previously supplied prior to a respective shutdown, until the temperature associated with the EVSE assembly is maintained below the predefined temperature threshold during the charging event.

* * * * *